(12) United States Patent
Jin et al.

(10) Patent No.: US 6,654,683 B2
(45) Date of Patent: Nov. 25, 2003

(54) METHOD AND SYSTEM FOR REAL-TIME NAVIGATION USING MOBILE TELEPHONES

(76) Inventors: HaiPing Jin, 2502 Arrowood La., San Jose, CA (US) 95130; Yi-Chung Chao, 1027 Nova Ct., Milpitas, CA (US) 95035; Longxue Li, 20875 Valley Green Dr. #31, Cupertino, CA (US) 95014; Ruslan Adikovich Meshenberg, 1000 Keily Blvd., Santa Clara, CA (US) 95051; Kentaro Tokusei, 810 Coleman Ave. #15, Menlo Park, CA (US) 94025; Salman Dhanani, 9634 179th Pl. NE. #4, Redmond, WA (US) 98052

(*) Notice: Subject to any disclaimer, the term of this patent is extended or adjusted under 35 U.S.C. 154(b) by 41 days.

(21) Appl. No.: 09/884,841

(22) Filed: Jun. 18, 2001

(65) Prior Publication Data

US 2002/0029107 A1 Mar. 7, 2002

Related U.S. Application Data (63) Continuation-in-part of application No. 09/547,421, filed on Apr. 11, 2000, now Pat. No. 6,266,615.
(60) Provisional application No. 60/156,225, filed on Sep. 27, 1999, and provisional application No. 60/211,994, filed on Jun. 16, 2000.

(51) Int. Cl.[7] ............................................. G01C 21/26
(52) U.S. Cl. ........................ 701/207; 701/210; 340/995
(58) Field of Search ............................... 701/201, 202, 701/205, 207, 209, 208, 210; 455/456; 340/990, 995

(56) References Cited

U.S. PATENT DOCUMENTS

| | | | | |
|---|---|---|---|---|
| 5,278,424 A | * | 1/1994 | Kagawa | 250/559.37 |
| 5,528,248 A | | 6/1996 | Steiner et al. | 342/357 |
| 5,579,535 A | | 11/1996 | Orlen et al. | 455/33.1 |
| 5,610,821 A | | 3/1997 | Gazis et al. | 364/444.2 |

(List continued on next page.)

FOREIGN PATENT DOCUMENTS

| | | |
|---|---|---|
| DE | 196 21 424 A1 | 12/1997 |
| WO | 99/27742 | 6/1999 |

OTHER PUBLICATIONS

Supplementary European Search Report, dated Nov. 14, 2002, for Application Number Ep 00967228.
International Search Report, dated Dec. 19, 2002, for International Application No. PCT/US02/02323, filed Jan. 24, 2002.
International Search Report, dated Mar. 26, 2001, for International Application No. PCT/US00/35075, filed Dec. 21, 2000.
International Search Report, dated Jan. 4, 2001, for International Application No. PCT/US00/27083, filed Sep. 27, 2000.
International Search Report, dated Jan. 12, 2001, for International Application No. PCT/US00/26921, filed Sep. 27, 2000.

Primary Examiner—Tan Nguyen (57) ABSTRACT

In an Interactive Real-Time Distributed Navigation system a method and system is disclosed for implementing a warm start/cold start option. Through selection of the warm start option, an interactive session for providing navigational directions to a user is more quickly established because a user's position is assumed not to be ambiguous. A method of the invention verifies this assumption. Through selection of the cold start option, the method of the invention seeks to remove ambiguity in a user's position before providing navigational directions. If, however, a user's position is not ambiguous, the method of the invention reverts to a warm start condition to immediately transmit navigational directions to the user.

32 Claims, 7 Drawing Sheets

U.S. PATENT DOCUMENTS

| | | |
|---|---|---|
| 5,742,131 A | 4/1998 | Sprout et al. ................ 455/456 |
| 5,742,509 A | 4/1998 | Goldberg et al. ......... 364/449.5 |
| 5,774,828 A | 6/1998 | Brunts et al. ................ 701/210 |
| 5,774,829 A | 6/1998 | Cisneros et al. ............ 701/213 |
| 5,838,562 A | 11/1998 | Gudat et al. ............ 364/424.02 |
| 5,884,218 A | 3/1999 | Nimura et al. .............. 701/208 |
| 5,902,350 A | 5/1999 | Tamai et al. ................ 701/211 |
| 5,904,728 A | 5/1999 | Tamai et al. ................ 701/211 |
| 5,910,177 A | 6/1999 | Zuber ........................ 701/202 |
| 5,912,635 A | 6/1999 | Oshizawa et al. .......... 340/988 |
| 5,922,042 A | 7/1999 | Sekine et al. ................ 701/210 |
| 5,928,295 A | 7/1999 | Geier .......................... 701/29 |
| 5,928,307 A | 7/1999 | Oshizawa et al. .......... 701/210 |
| 5,933,100 A | 8/1999 | Golding ..................... 340/995 |
| 5,938,720 A | 8/1999 | Tamai ........................ 701/209 |
| 5,938,721 A | 8/1999 | Dussell et al. .............. 701/211 |
| 5,987,381 A | 11/1999 | Oshizawa ................... 701/209 |
| 6,014,090 A | 1/2000 | Rosen et al. ................ 340/905 |
| 6,021,371 A | 2/2000 | Fultz ........................ 701/200 |
| 6,029,069 A | 2/2000 | Takaki ........................ 455/456 |
| 6,032,098 A * | 2/2000 | Takahashi et al. ........... 701/210 |
| 6,055,478 A | 4/2000 | Heron ........................ 701/213 |
| 6,070,123 A | 5/2000 | Beyer et al. ................. 701/209 |
| 6,107,944 A | 8/2000 | Behr et al. .................. 340/995 |
| 6,112,099 A | 8/2000 | Ketola ........................ 455/466 |
| 6,115,700 A | 9/2000 | Ferkinhoff et al. ............ 706/13 |
| 6,148,261 A | 11/2000 | Obradovich et al. ........ 701/208 |
| 6,154,658 A | 11/2000 | Caci ........................... 455/466 |
| 6,175,806 B1 | 1/2001 | Thuente ..................... 701/213 |
| 6,175,807 B1 | 1/2001 | Buchler et al. .............. 701/220 |
| 6,199,045 B1 | 3/2001 | Giniger et al. ................. 705/1 |
| 6,205,400 B1 | 3/2001 | Lin ............................ 701/214 |
| 6,208,295 B1 | 3/2001 | Dogan et al. ................ 342/378 |
| 6,243,657 B1 | 6/2001 | Tuck et al. .................. 702/150 |
| 6,266,615 B1 | 7/2001 | Jin ............................. 701/213 |
| 6,269,306 B1 | 7/2001 | Ibrahim et al. ............. 701/214 |
| 6,401,035 B2 | 6/2002 | Jin ............................. 701/213 |
| 6,405,123 B1 | 6/2002 | Rennard et al. ............ 701/200 |

\* cited by examiner

FIG. 2

INTERACTIVE REAL TIME DISTRIBUTED NAVIGATION SYSTEM—ARCHITECTURE B

• WIRELESS PHONES OR PDAs WITH POSITION CAPABILITY

FIG.5 INTERACTIVE REAL TIME DISTRIBUTED NAVIGATION SYSTEM–USER END FUNCTIONS

METHOD AND SYSTEM FOR REAL-TIME NAVIGATION USING MOBILE TELEPHONES

This application is a continuation-in-part of Ser. No. 09/547,421 Apr. 11, 2000 U.S. Pat. No. 6,266,615 and claims benefit of No. 60/156,225 Sep. 27, 1999 and claims benefit of No. 60/211,994 Jun. 16, 2000.

I. FIELD OF THE INVENTION

This invention relates to navigation systems and location based information delivery. Specifically, this invention relates to a method and system for delivering interactive and real-time navigational information using distributed navigation information processing and mobile telephones.

II. BACKGROUND OF THE INVENTION

Many navigation systems are based on satellite-based global positioning system (GPS) devices which have been applied in automobile navigation systems, see, e.g., U.S. Pat. Nos. 5,938,720, 5,928,307, 5,922,042, 5,912,635, 5,910,177, 5,904,728, 5,902,350, all incorporated herein by reference for all purposes. Such automobile navigation systems, however, are expensive and inconvenient to use. Many such systems are further not appropriate for walking. Therefore, there is a great need in the art to incorporate navigation systems in personal handheld devices.

However, there are several technical obstacles that prevent the incorporation of navigational capabilities in handheld devices for providing turn-by-turn real-time navigation services. One such obstacle is the amount of geographic data needed to provide reasonably detailed navigational information. Small handheld devices include cellular phones, personal digital assistants, or computers, however, the amount of embedded memory is limited and is impractical to store a large amount of geographic information. In existing automobile navigation systems, GPS systems are employed to provide information about the location and movement of a user. Geographic information is usually stored in a geographic mapping database stored on a CD-ROM, hard-disk drive device or other large capacity storage medium.

Another obstacle is that the lack of information processing power of small devices such as those mentioned above. For example, the information processing power of a cellular telephone is typically provided by an embedded microprocessor with limited memory. While the information processing power of embedded microprocessors is generally increasing, such processors are still not suitable for processor intensive real-time navigational tasks.

An additional obstacle is the insufficient location accuracy provided by current technology. Initial sources of inaccuracy of the GPS based systems, for example, are either imposed by the U.S. Department of Defense through Selective Availability (S/A), other sources of error are due to atmospheric and timing errors limiting the accuracy of a single GPS receiver to +/−50 meters. Methods exist which can be used to enchance accuracies to +/−5 meters. Such methods include Enhanced GPS systems (i.e., SnapTrack) and network based system (i.e., Truepoint). These methods use a known position, such as a survey control point, as a reference point to correct the GPS position error. These methods of correcting GPS positions are referred to as Differential GPS or DGPS. The DGPS corrections can be applied to the GPS data in real-time using data telemetry (radio modems). Toward expanding the use of DGPS, the United States and Candian Coast Guard are establishing a series of radio beacons to transmit the DGPS corrections for accurate navigation along the Great Lakes, the Mississippi River and tributaries, the Gulf Coast, and the Eastern and Western coasts of North America. However, such radio beacons are not available to consumers traveling in most inland locations.

Location information that is ambiguous due to a number of factors discussed above makes navigational systems difficult to develop. For example, if the user is driving in a downtown area with streets spaced close together, a GPS location within +/−50 meters is not adequate to give turn-by-turn directions. The GPS location information is thus considered ambiguous and inappropriate for navigation systems. In other situations, a GPS location within +/−50 meters is adequate for navigation purpose. For example, if a user is driving on a highway in a remote area without any nearby exits, the GPS location is sufficient for calculating further navigation directions. Thus, in such a situation, the GPS location is not ambiguous.

Current automobile GPS navigation systems make use of other sensors, such as accelerometers, speedometers, etc. plus some sophisticated filtering technology to improve the accuracy of a navigational system (see, e.g., U.S. Pat. No. 5,912,635, previously incorporated by reference for all purposes). In addition, many automobile-based navigational systems use map-aiding technology as well. However, for a navigational system implemented using handheld devices such as cellular telephones, it is impractical to have the handheld devices connected to external sensors, especially when the device is used while walking.

Accordingly, it would be desirable to provide a navigational system that provides accurate navigational instructions. It would further be desirable to provide a navigational system that can be implemented on an existing infrastructure and is adaptable to new infrastructures as they become available.

It would further be desirable to provide a navigational system that can be implemented on handheld devices with limited computational power as well as devices with enhanced computational power.

It would further be desirable to provide a navigational system that can make use of many forms of real time information to provide accurate location calculations as well as optimal navigation paths.

III. SUMMARY OF THE INVENTION

These and other objects are provided for by a system and method for interactive real-time distributed navigation. In an embodiment of the invention, a user advantageously makes use of an often under-utilized sensor—a user's eyes. Toward reducing an ambiguity associated with a location derived from a positional sensor, the present invention prompts for and utilizes a user's input. In an embodiment, a consolidated list of candidate locations are presented to a user. A user's selection from such list is then used to correct for errors in other position detecting sensors.

In another embodiment of the invention, an enhanced and simplified dynamic real-time navigation system is provided based upon distributed computing and database systems. In such a manner, wireless devices with limited computational power interact with distributed servers that execute any necessary intensive processing. In another embodiment, geographic map information databases are advantageously stored on distributed servers with large storage capacity.

In another embodiment, depending upon the capability of a user's device, data storage and navigation calculation load are dynamically distributed between the server and the device. In an embodiment, a user sends a request to navigate from a current location (or point A) to point B. A server, after receiving the request (including destination information) and user's location, the system of the present invention generates a global navigation route across several small geographic areas. The server then sends navigational information relating to a first small geographic area to the user's device. Once the user moves out of the first small geographical area, the information will be updated by the server either at the request of the user's device or initiated by the server based upon the location of the user.

Another aspect of the invention provides navigation guidance based on real-time traffic conditions. The traffic information can be obtained from a group of navigational service users, by observing their speeds and making comparisons with the nominal street speed limits in a map database. This traffic information assists the system to determine an optimal route for its users in real-time. At each juncture, the system will dynamically determine an optimal path to get to the destination based on the traffic information. The best route can be defined based on the user's request, for example, it can be either time or gas consumption which will be minimized.

Another embodiment of the invention provides directions in a queue ahead of time. This is particularly important for wireless device navigation because of the small screen. For example, the server prompts, either by voice or text, "you are going to see University Ave. in about 5 minutes (or 500 yards), where you should turn right." In the mean time, if not necessary, the communication link can be released to reduce the server traffic.

Yet another embodiment of the invention provides for warm/cold start operation. In a warm start situation, a position is assumed not to be ambiguous such that a navigational session is immediately provided to a user. In such a warm start situation, however, a method is provided for assuring that a warm start session is appropriate. Where appropriate, the warm start session continues. Where not appropriate, the warm start session reverts to methods for removing ambiguity of a user's location. Where a cold start session is selected, a method of the invention checks whether conditions for a warm start are met. Where warm start conditions are met, a user's position is not ambiguous such that a navigational session is immediately provided to the user.

IV. BRIEF DESCRIPTION OF THE DRAWINGS

The accompanying drawings, which are incorporated in and form a part of this specification, illustrate embodiments of the invention and, together with the description, serve to explain the principles of the invention.

V. DETAILED DESCRIPTION OF THE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. The invention is intended to cover alternatives, modifications and equivalents, which may be included within the spirit and scope of the invention as defined by the appended claims.

As will be appreciated by one of skill in the art, the present invention may be embodied as a method, data processing system or program products. Accordingly, the present invention may take the form of navigation systems, navigation methods, navigation devices, navigation software, etc. Software written according to the present invention is to be stored in a form of computer readable medium, such as memory, or CD-ROM, to be transmitted over a network, and executed by a processor.

A key component of a navigation system is the determination of the location (or position) of a user. It is intended that the term location (referred to herein as the measurement of a geographic location) includes information related to the position of an object. A location may contain three dimensional information that completely define the exact position of an object. In some embodiments, a location may contain two dimensional information to define an object in a two dimensional space. In some additional embodiments, a location may contain information that is not sufficient to completely define the position of an object. Broadly defined location, as used herein, also may include speed, time, direction of movement, etc. of an object.

One skilled in the art would appreciate that the format of location information is not critical to some embodiments of the invention. For example, in some embodiments, location information is presented in the format of (x, y), where x and y are two ordinates define the geographic location of an object, i.e., a user.

Figure 1:
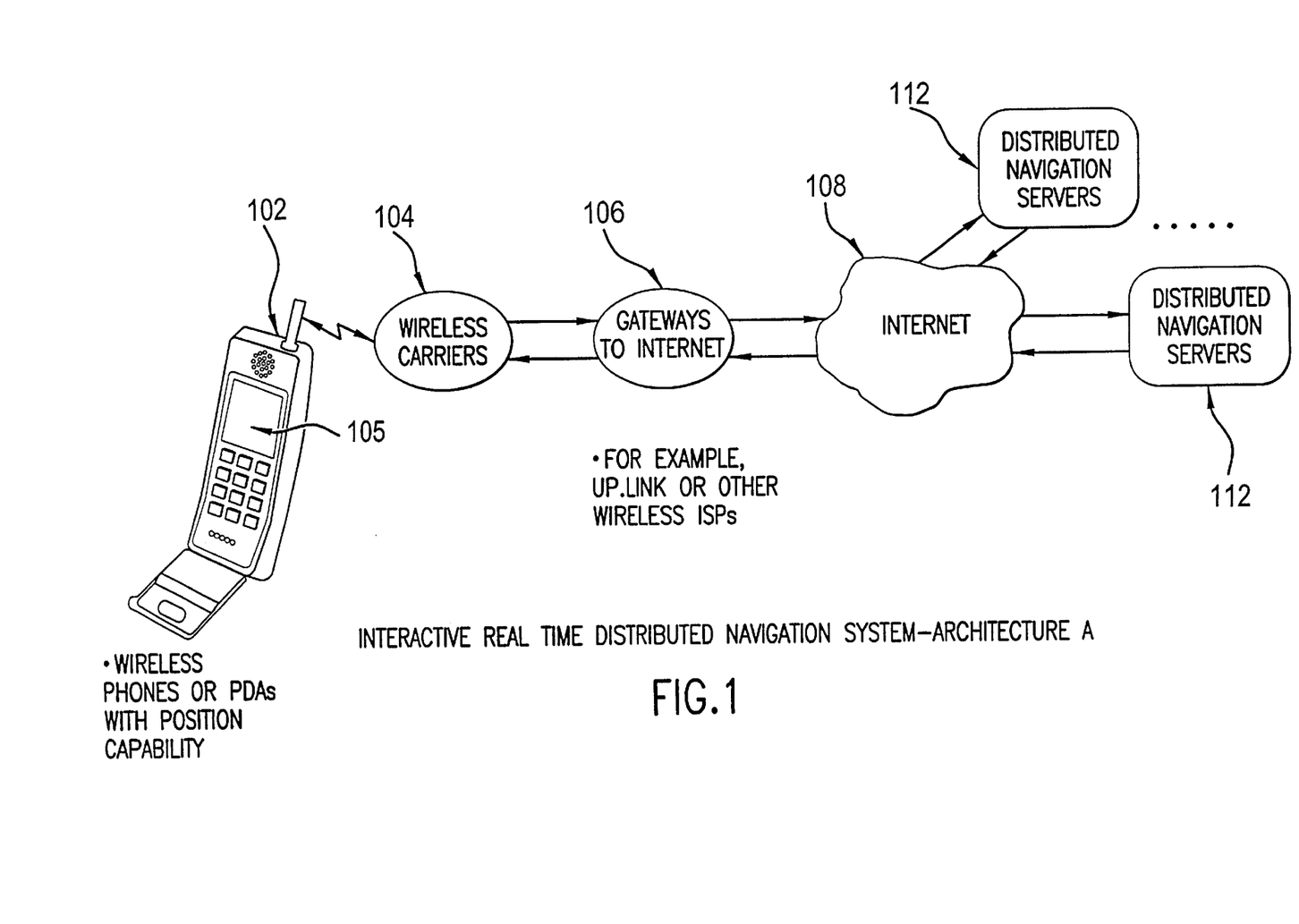
FIG. 1 is a schematic showing an embodiment of the Interactive Real-time Distributed Navigation System- Architecture A (Internet)

FIG. 1 shows an architecture for an Interactive Real-Time Distributed Navigation System in accordance with a preferred embodiment. The various components and their interaction will now be described. It is to be understood that where like numerals are used in different figures, such like numerals refer to the same item. Wireless device 102 may take the form of a cellular telephone, satellite telephone, wireless Personal Digital Assistant (PDA), personal computer or other suitable device having wireless communications capability. Wireless device 102 is equipped with positioning capability that takes the form of, for example, global positioning systems (GPS), emergency 911 (E911) location, or some other positioning systems as they become available. One skilled in the art will appreciate that the present invention is not limited to any particular positioning technology. In an embodiment, wireless device 102 is manufactured with built-in positioning capabilities Advantageously, wireless device 102 does not need to carry map information, can carry a predetermined amount of map information, depending on the wireless device's 102 storage capability.

Such a system is described as a distributed system and will be further discussed below.

In an embodiment, the capabilities of wireless device 102 are enhanced through interfacing with modular attachments. A major function of wireless device 102 is to provide an interface between the invention and a user. Furthermore; as will be described more fully below, wireless device 102 provides a user interface 105 for displaying graphical, textual or audible information. User interface 105 incorporates the user's sensory capabilities within the invention. User interface 105 is used to allow user interaction with electromechanical components of the invention. Such interaction is used to improve the positioning accuracy of the invention where interaction achieved through text, graphics or audible signals are within the scope of the invention.

Because wireless device 102 is capable of relaying information to a user by means of audible signals or through text messages displayed on wireless device 102, embodiments of the invention make use of audible sound producing devices, as well as, text displaying devices. Where a text displaying device is used, enhanced performance is achieved through a wireless device 102 capable of displaying several lines of text. An enhanced video display is also appropriate for wireless device 102 as maps and enhanced directional information are displayed on such devices. In another embodiment, wireless device 102 is directionally oriented through gyroscopic or geomagnetically enhancements, which are then used by the device or server to provide real time position and orientation information. One of skill in the art realizes that many more implementations are possible for wireless device 102 without deviating from the teachings of the invention.

As further shown in FIG. 1, wireless carrier 104 provides wireless connectivity between wireless device 102 and distributed navigation servers 112 to be described further below. Examples of wireless carrier 104 include cellular telephone carriers, satellite communications carriers or global positioning system carriers. In achieving wireless connectivity, wireless carriers provide an existing infrastructure for the wireless devices and distributed navigation servers. In an embodiment, GPS is used along with the government imposed selective availability. One with skill in the art will understand that where such limitation is removed, the present invention can further be enhanced. Because of the adaptive interaction with the user, information ranging from general to very specific is relayed to the user for a wide range of navigational applications.

While keeping within the teachings of the invention wireless carrier 104 provides positioning information such as through GPS, E911 or other positioning systems. Alternatively, positioning information is obtained through a third party and is then used by wireless carrier 104. For example, wireless service resellers, wireless internet service provides (ISPs), or satellite wireless carriers, among others, provide the services necessary to practice the invention. Importantly, wireless throughput and bandwidth continues to increase-through the advent of digital transmission and through other techniques. Analog (i.e., AMPS) systems provide for a certain level of service. However, more advanced digital transmission techniques, such as, but not limited to GSM, TDMA, CDMA, provide higher data throughput. At the time of the invention, CDMA provides the highest throughput of information, however, it is expected that wireless technology will further be developed. Because of its broad application, the present invention is appropriate for these and many other transmission techniques. In an embodiment of the invention, wireless carrier 104 receives analog or digital information from the wireless device 102 and directs such information to other components of the invention. Similarly, wireless carrier 104 receives information from components of the invention and then directs such information to wireless device 104.

As shown in FIG. 1, wireless carrier 104 is connected to gateway 106 which provides an interface to network 108. Gateway 106 is provided by, among others, wireless carriers, ISPs, or other telecommunications providers. In an embodiment of the invention, network 108 is the Internet. The Internet provides advantages because it is a widely distributed network reaching many areas of the world. In another embodiment, network 108 is implemented as a proprietary network. By implementing a specialized network, network 108 may be customized to provide minimal latency and optimal performance.

As shown in FIG. 1, a plurality of distributed navigation servers 112 are incorporated as part of the invention by communicating using network 108. Distributed navigation servers 112 store street map information and point of interest information and further perform processing tasks. In this manner, wireless device 102 is not burdened with carrying all the necessary information for proper navigation. In an embodiment, distributed navigation servers 112 also process location specific information such as real-time traffic information. In an embodiment, traffic information is obtained from a group of navigation service users. By observing and comparing their positions, speeds and times, and making further comparisons with nominal street speed limits in a map database, real-time traffic information is generated and then used by the invention. At each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route can be based on minimum time, minimum distance or minimum consumption of fuel. Processor intensive functions such as navigation guide algorithms are processed by distributed navigation servers 112 so as to reduce the computational burden on wireless device 102. As part of the processing function of distributed navigation servers 112, in an embodiment, these servers provide conversion functions such as between HDML or WML to HTML and vice versa.

Figure 2:
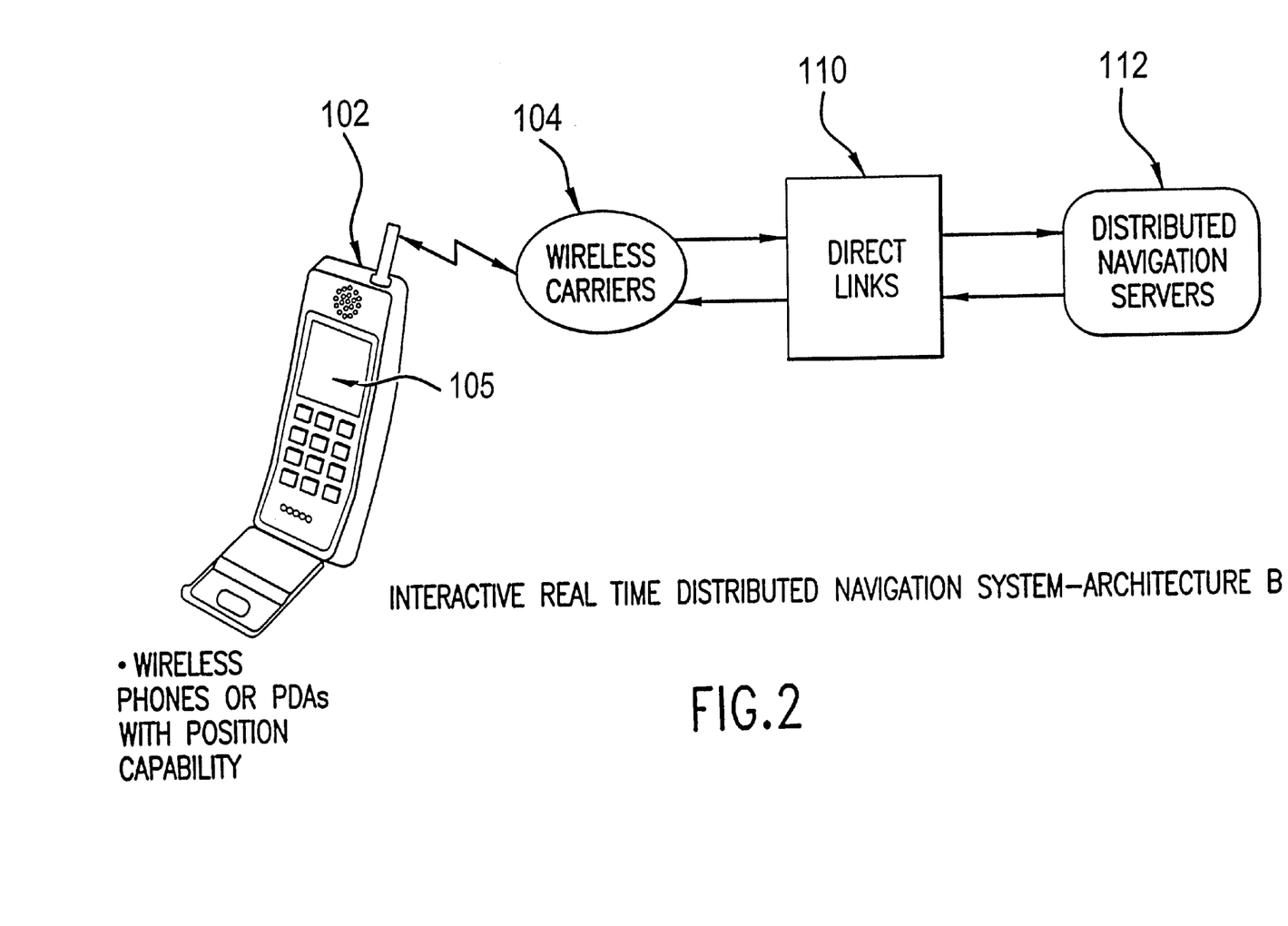
FIG. 2 is a schematic showing another embodiment of the Interactive Real-time Distributed Navigation System- Architecture B (Direct links)

An alternative embodiment for the system architecture of the present invention is shown in FIG. 2. As shown in FIG. 2, wireless device 102, wireless carrier 104 and distributed navigation servers 112 are substantially the same as described for FIG. 1. Direct links 110, however, provide an alternative embodiment to the function of gateway 106 and network 108 of FIG. 1. The direct link architecture is applicable where Internet infrastructure is not well established or fast response is desired for user navigation or other location specific information services. Illustratively, T1, Frame Relay, etc. linked by a LAN or WAN are appropriate for direct links 110. In another embodiment, direct links 110 are implemented as dedicated lines. Alternatively, direct links 110 are implemented as hard wired connections between wireless carrier 104 and distributed navigation servers 112 where wireless carrier 104 and distributed navigation servers 112 are collocated in a central office.

Figure 3:
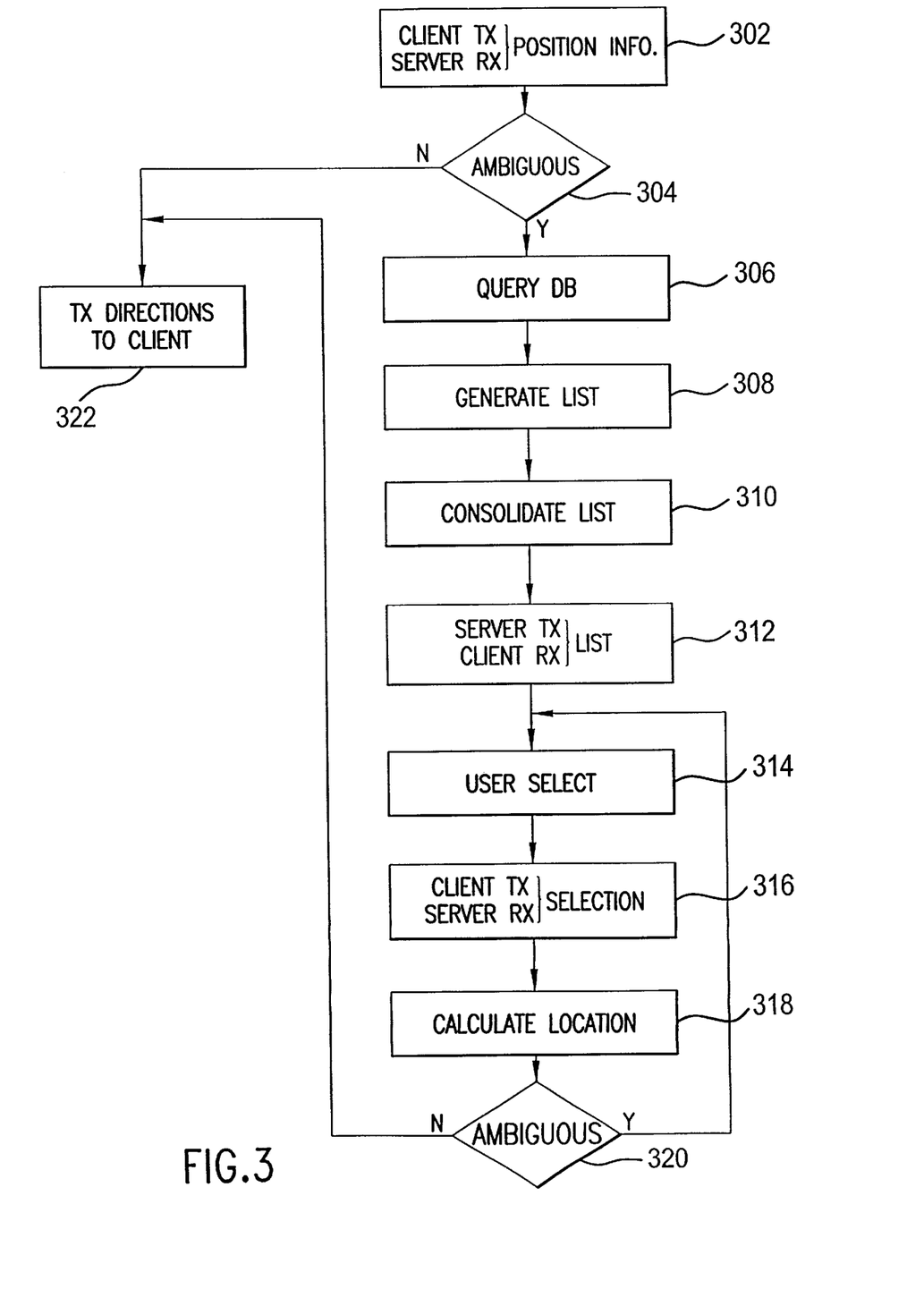
FIG. 3 is a flowchart of a method for navigation according to the invention.

FIG. 3 shows steps of an interactive real-time distributed navigation system in accordance with a preferred embodiment. At step 302 a client transmits position information to a server and a server receives such information. In an embodiment, the client is a device such as wireless device 102 discussed with reference to FIG. 1. The server is a device such as distributed navigation server 112 also discussed with reference to FIG. 1. At step 304 a determination is made as to whether the position information is ambiguous. If the position information is not ambiguous, the server determines proper directions to a destination which are then transmitted by the server and received by the client at step 322.

A location contains various degrees of inaccuracies. For example, most GPS receivers can provide location information accurate to within a range of approximately 50 meters, i.e., an inaccuracy of around 50 meters. There are a number of known factors that may affect the accuracy of a location determination. Weather conditions may affect the accuracy of a GPS location determination. In an embodiment of the invention, a location, in addition to information defining the position of an object, is also associated with an estimated error and a range. One of skill in the art appreciates that the error of a positioning system is estimated based upon the characteristics of the positioning device and other factors including weather and transmission conditions.

Whether or not a location is ambiguous may be dependent upon many factors including, but not limited to: the accuracy associated with the location; attributes of a road network; recent traveling history; and map accuracy.

In general, the more accurate a location, the less likely it is ambiguous. The attributes of a road network, such direction, turns, etc., can be useful in removing ambiguity. Illustrations are helpful: if one is traveling in on a highway in a remote area without any exits, a location associated with error of around 50 meters is not ambiguous for navigation purpose, because the navigation direction will be "going along the highway". Contrastingly, a location associated with an error of 50 meters is ambiguous if the location is within a business district of a downtown urban area where street blocks are less than 10 meters away. In an embodiment of the invention, whether a location is ambiguous is also dependent upon traffic regulations and traffic conditions. For example, if there are only two roads (Road A and B) within the range of a location (location+/−error), where the user is travelling at a speed of 55–80 miles/hr and road A has speed limit of 25 miles per hour, the location is unambiguous for the purpose of navigation because the user's location can be determined to be on Road B with a high degree of confidence.

A user's recent travel history is utilized in an embodiment of the invention to reduce ambiguity, for example, by performing a pattern recognition analysis of the user's travel history within a particular area. Illustratively, a user's travel history may be recorded or logged over a predetermined time and used in an auto-regressive manner.

Returning to the discussion of FIG. 3, if at step 304, the position information is determined to be ambiguous, further novel steps are taken to remove ambiguity of position information. With the received ambiguous position information in conjunction with an associated error for a particular positioning system in use, a query is made of a map database at step 306. From the query at step 306, a list is generated at step 308 of various candidate locations. In an embodiment of the invention, the candidate locations of step 308 are associated with notorious attributes such as landmarks, buildings, street intersections or street names, etc. One of skill in the art appreciates that various types of database structures can be useful for implementation with an embodiment of the invention. The aforementioned patents incorporated by reference also serve to demonstrate existing databases, search methods, and algorithms.

The list generated at step 308 may be unwieldy for purposes of displaying on wireless device 102 where such device has a small screen. Therefore, at step 310, the candidate list is consolidated to a smaller list. Illustratively and without limitation, a list of 400 candidate locations ("candidates") is too large to display on an LCD screen of a typical cellular telephone or personal digital assistant. Through step 310, however, a shortened consolidated list is generated that can easily be displayed on a small screen. Known statistical and predictive methods are used to reduce the candidate list to only those candidates with a high probability of being a true location. Furthermore, historical or auto-regressive information may be used to further consolidate the list. In an alternative embodiment, a consolidated list is ranked based upon a probability of being closest to the user.

At step 312, the server then transmits and the client receives the consolidated list. At step 314, a user is incorporated into the present invention by sensing his surroundings and then selecting an appropriate choice from among the consolidated list presented on the client such as wireless device 102. This invention fully utilizes existing sensors—user's eyes and other human senses—to improve the accuracy of the position determination of the present invention. Through the user's sensory perception, the user interacts with the present invention to enhance the quality of its navigational directions. In this way, the user incorporates his eyes to confirm the navigation guide from the system. For example, when the user requests navigational guidance from the server, the server will compare the direct location measurement with a map. Because of the location determination accuracy is typically ambiguous, the user's true location may be different from what the location measurement indicates. Therefore, the navigation system of the invention employs user's eyes are used as additional sensors to the whole system to improve the location determination accuracy and navigation quality.

Illustratively and without limitation, at step 314, the user selects the closest landmark to assist the server in locating the user accurately. In another embodiment, a user is asked to select a candidate location in specified direction. An illustrative prompt is "Please select a candidate location directly in front of you." In yet another embodiment, a user is asked to select multiple locations. Illustratively, a user is asked to pick 3 locations around him, such that averaging or triangulation techniques are available at step 318 to be discussed below. One of skill in the art appreciates that location information can be derived from the user and a user selection in other appropriate manners without deviation from the invention.

In embodiments of the invention, user interaction at step 314 is done audibly or textually. At step 316, the user selection is then transmitted by the client and received by the server. At step 318, an improved user location is calculated using the user selection information in several ways without deviating from the invention. In an embodiment, a user's locations is calculated based on the location of the user's selection. Alternatively, the user's location is calculated as a function of both the location of the user's selection and the ambiguous location determined by a location sensor. One of skill in the art will appreciate that there are other methods of calculating the location of a user.

At step 318, a digital filtering processes is used to determine calculate a user's location. In this manner, the interaction with the user is only necessary when the confidence level of the server in determining the user location is below a predetermined level. A confidence level is obtained by comparing the processed location to a map database. If an ambiguity exists at step 320, the steps 314–320 are repeated until an ambiguity no longer exists.

Having determined a location that is not ambiguous, at step 322, the server transmits appropriate navigational directions to the client and the client receives such directions and displays them to the user on wireless device 102.

Figure 4:
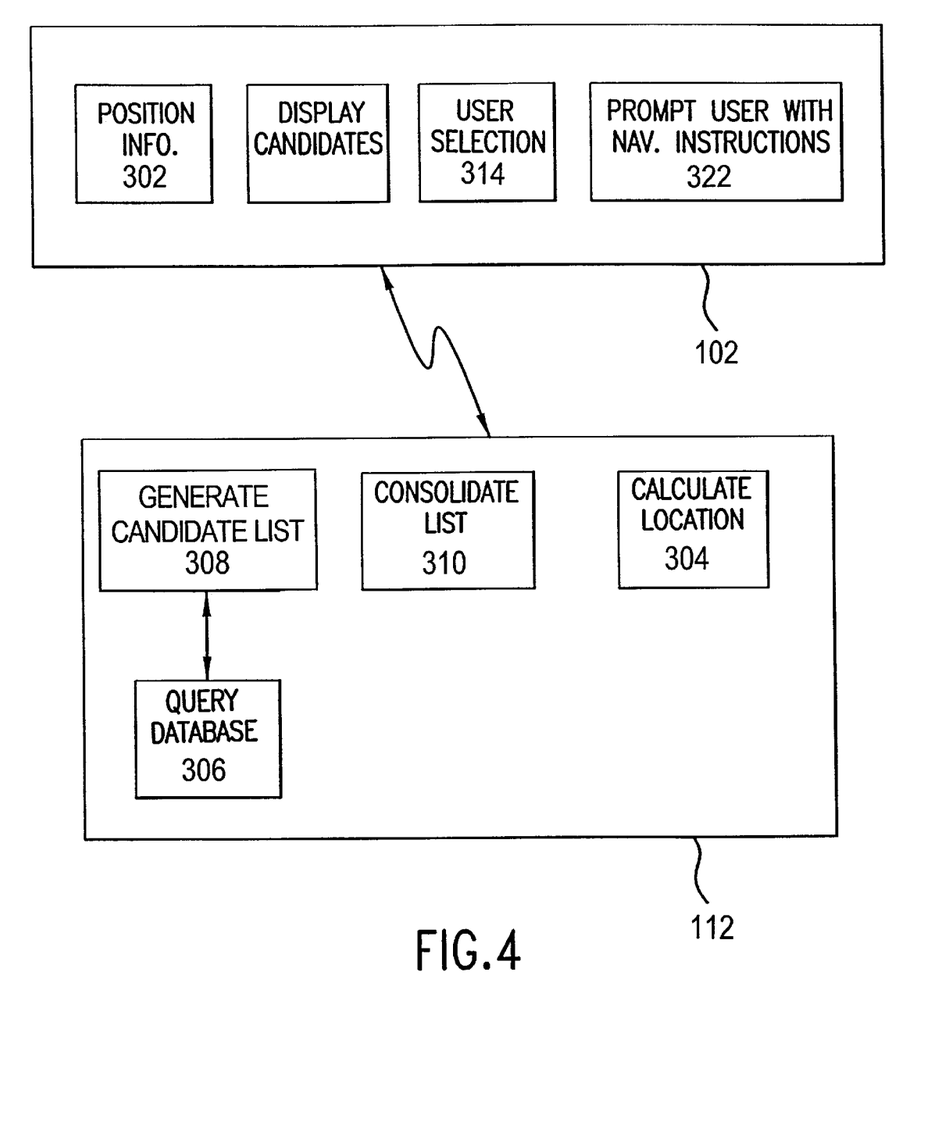
FIG. 4 is a schematic showing a method for navigating according to the invention.

FIG. 4 shows an embodiment of how some tasks are distributed between a client wireless device 102 (i.e., cellular telephone, PDA, or GPS receiver) and distributed navigation server 112 (see FIG. 1) in accordance with the method of FIG. 3. Advantageously, because of the distribution of tasks, wireless device 102 is implemented as a device of reduced size and weight thereby making it appropriate for driving as well as walking. At wireless device 112, step 302 is performed to generate position information of the user which is then communicated over a wireless medium to server 112 where step 304 is performed to determine whether the user's position information is ambiguous. If it is, server 112 then queries a database (step 306) of map information to generate a list (step 308). After consolidation (step 310), the consolidated list is then transmitted (step 312) over the wireless medium to the client wireless device 102, where it is displayed. After observing his surroundings, the user makes a selection (step 314) from the candidate list on wireless device 102. Such information is then transmitted (step 316) to the server where it is used to calculate an improved location (step 318). When the server 112 determines that the location is no longer ambiguous (step 320), the server prompts the user with navigational instructions (step 322).

In the description of FIGS. 3 and 4, an embodiment was described wherein the user wireless device 102 (see FIG. 1) is of limited processing and storage capability such that various steps were described as being performed by distributed servers 112. In this manner, wireless device 102 is implemented as a device with limited computational power where processor intensive tasks are distributed among the servers 112 One of skill in the art, however, appreciates that the method of the present invention is also appropriate on a wireless device 102 with enhanced capabilities. Illustratively and without limitation, where wireless device 102 contains an enhanced processor, memory, and high capacity storage space (i.e., hard drive), the steps of FIG. 3 described as being performed by the server, may be allocated to be performed at the client (i.e., wireless device 102). In such an embodiment, one of skill in the art will also appreciate that the client to server and server to client transmissions are appropriately reallocated. Furthermore, one of skill in the art appreciates that many different distributions of tasks remain within the scope of the invention.

Figure 5:
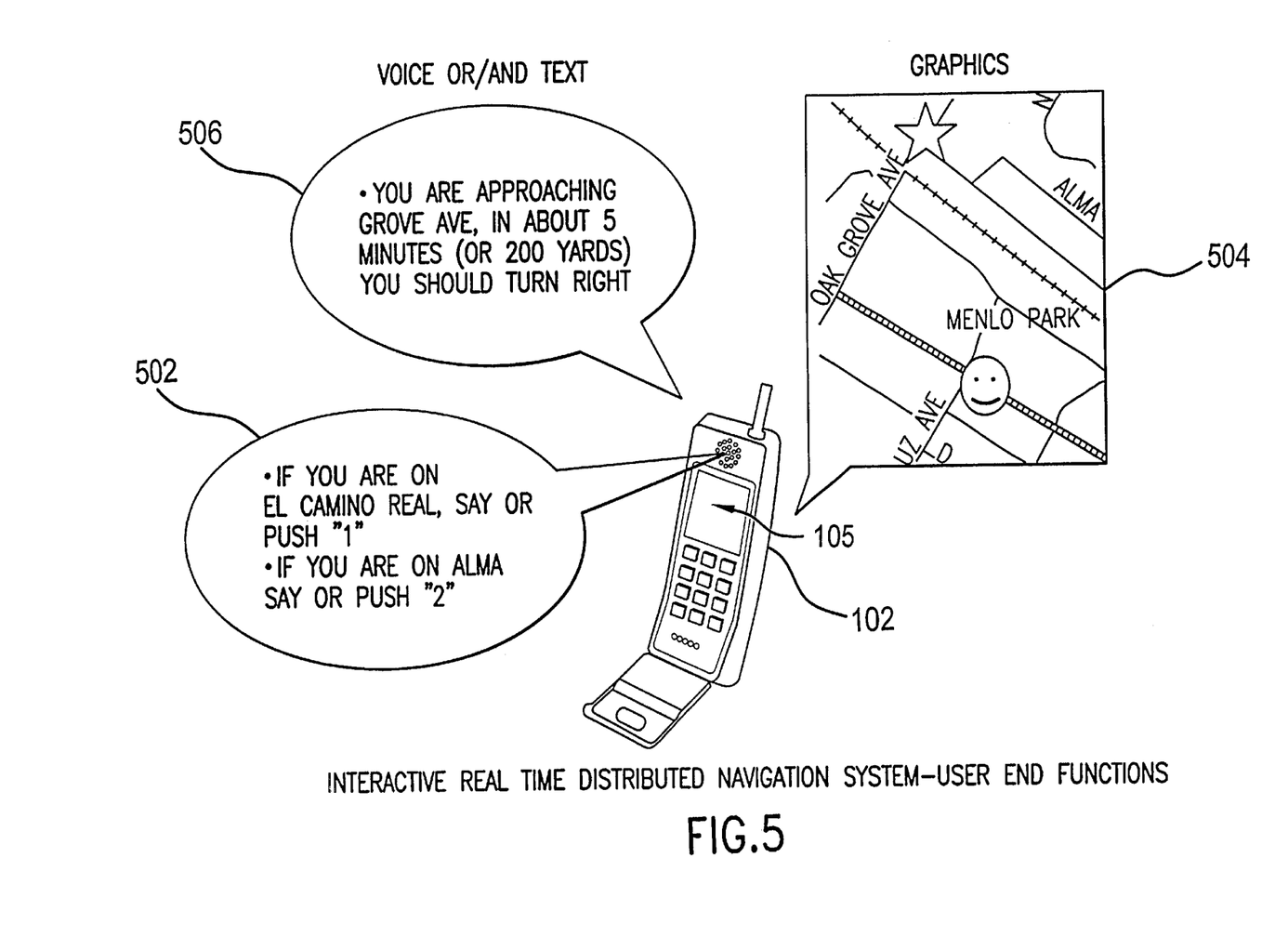
FIG. 5 is a schematic showing one embodiment of the Interactive Real-time Distributed Navigation System- User end.

With an understanding of the architecture and method of the present invention, a user's session with an embodiment of the present invention will now be described with reference to FIG. 5. In FIG. 5, wireless device 102 is implemented as a cellular telephone with a graphics display. Illustratively, wireless device 102 will be described in voice mode, but one of skill in the art will understand that the invention can be implemented in a text mode of operation.

In a voice mode of operation, the system is implemented with voice recognition as well as grammar design capabilities. Currently, there are various ways to implement this voice capability. Among these is VoiceXML, Voice Extensible Markup Language, as specified by the VoiceXML Forum (see for example, http://www.w3.org/tr/voicexml). VoiceXML is designed for creating audio dialogs that feature synthesized speech, digitized audio, recognition of spoken and DTMF key input, recording of spoken input, telephony, and mixed-initiative conversations where its major goal is to bring the advantages of web-based development and content delivery to interactive voice response applications. There are various commercial tools that allow a programmer to create programs in VoiceXML that when properly executed, interact with a user of the present invention via audio channels through wireless device 102. In generating VoiceXML code, these commercial products create a "static" code that cannot change at runtime. Moreover, as the VoiceXML standard is changed and developed, existing programs may not be compatible such that existing programs may need to be changed or migrated to new standards as they are released.

Figure 7:
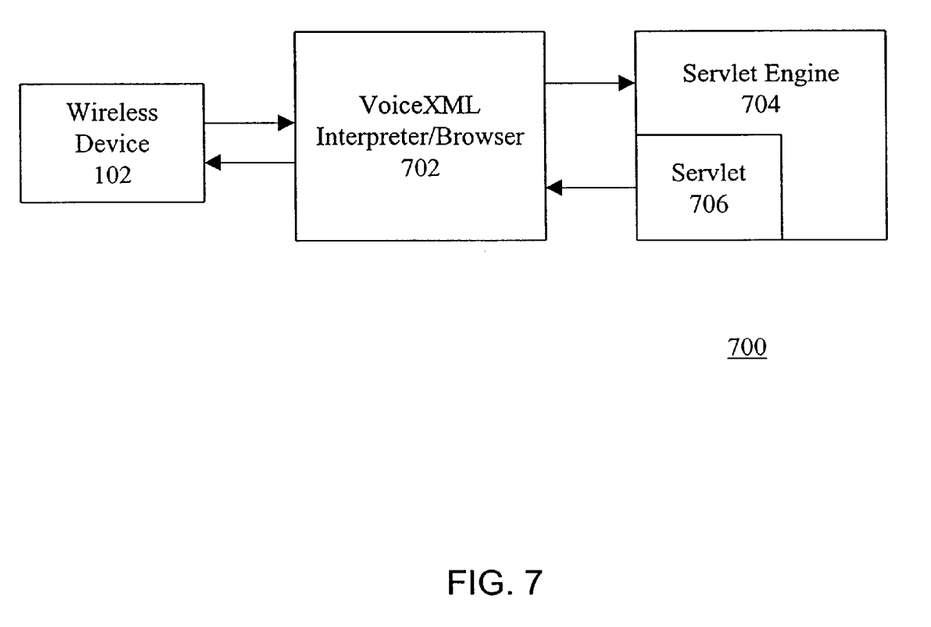
FIG. 7 is a schematic showing an embodiment for generating voice code at runtime in an Interactive Real-time Distributed Navigation System.

FIG. 7 is a block diagram of an apparatus for creating and generating VoiceXML code at run-time by creating a layer of indirection and using Java servlet technology. As shown in FIG. 7, VoiceXML interpreter/browser 702 acts as an interface between wireless device 102 and Java servlet engine 704 and Java servelet 706. In this manner, a programmer knowledgeable in Java can generate voice interactive software in accordance with the invention. This aspect is important because at present there are many more programmers knowledgeable in Java than in VoiceXML. In an embodiment, final code generation is deferred until servlet 706 is called by servelet engine 704. When servlet 706 is called, it generates VoiceXML code which is in turn interpreted by VoiceXML interpreter/browser 702. Thus, servlet 706 generates the final VoiceXML code at program run-time to create a higher productivity environment for the programmer. VoiceXML interpreter/browser 702 then delivers voice information to wireless device 102. Where a user inputs voice information through wireless device 102, such voice information is first directed to VoiceXML interpreter/browser 702 which then generates signals to that are interpreted by servlet engine 704. Voice interaction is, therefore, possible in directions to and from wireless device 102.

Referring back to FIG. 5, the user begins a session with the invention by speaking into wireless device 102 to provide a destination. With the destination information, the system then implements the method of the invention as described in FIG. 3. The system obtains position information and determines whether a position is ambiguous (steps 302–304). Upon querying the database, generating a list, and consolidating a list, the system presents a list of selections to the user (steps 306–312). In the voice mode of operation being described here, the system may present a section as shown in text bubble 502 where the system synthesizes a voice to say, "If you are on El Camino Real, say or push 1; if you are on Alma say or push 2." In the present example, the user observes his surroundings by reading a street sign. Assuming the user is on El Camino Real, the user says "1" to indicate the same. After appropriate processing as described for steps 314–322 of FIG. 3, the system removes the ambiguity of a user's location and correctly prompts him as shown in text bubble 506 by stating "You are approaching Grove Avenue, in about 5 minutes (or 200 yards) you should turn right." In this manner, the system provides a navigational guide ahead of time, so the user can use his/her eyes to confirm the navigation guide from the system.

In another embodiment, wireless device 102 is provided with an enhanced graphics display such that graphic 504 is displayed on the device. With such an enhanced display, navigational prompts are further provided. For example, after determining a user is on El Camino Real, the user may be audibly told "You are on El Camino Real; follow the arrows on the display to reach your destination." Illustratively, a direction arrow is displayed on the user device that provides instructions to the user as to where to proceed.

In another embodiment, where wireless device 102 is equipped with directional capabilities such as through the use of a gyroscope or geomagnetic sensing, the system provides real-time directional as well as navigational information. Illustratively, the system determines that the user must proceed north and the user is facing north, a device display shows an upward pointing arrow indicating that the user should proceed straight ahead. However, where the user must proceed north and he is facing south, the device display shows a downward pointing arrow indicating that the user should proceed backward or, more reasonably, turn around to face north and then proceed. In another implementation with a more enhanced display, more detailed and broader map information is displayed with more stylistic prompts to the user.

The invention further allows for the wireless device to be connected to an accessory display. For example, a wireless device 102 appropriate for walking is enhanced by interfacing with device with additional features such as a car-mounted display or portable computer to become better equipped for automobile navigation. In certain embodiments of the invention, the accessory device provides, without limitation, enhanced display capabilities, enhanced memory capacity, increased computational power, or increased throughput.

Figure 6:
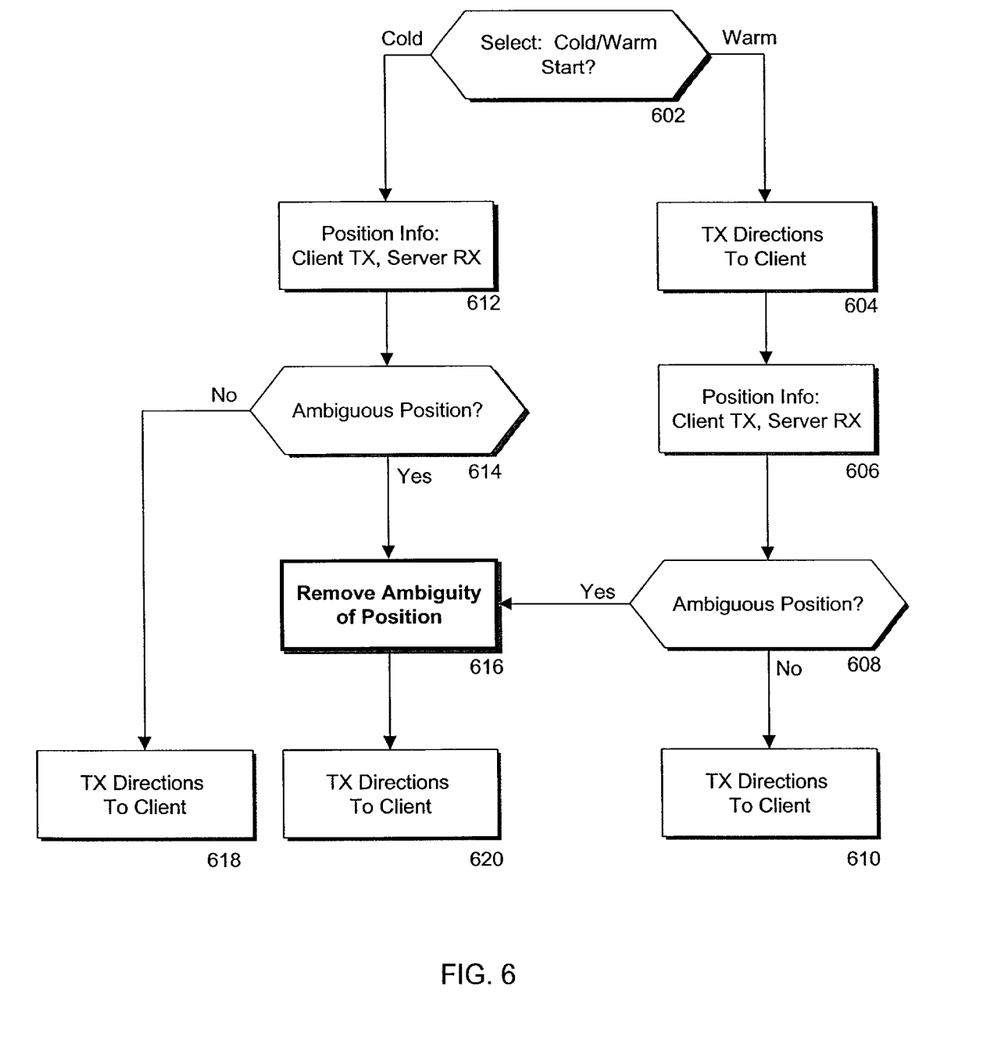
FIG. 6 is a flowchart of a method for providing warm start/cold start options in an Interactive Real-time Distributed Navigation System.

FIG. 6 shows steps of a method implemented in an interactive real-time distributed navigation system implementing a warm start/cold start option according to an embodiment of the invention. At step 602 a decision is made whether a warm start or a cold start is appropriate. In an embodiment, a user selects an option on wireless device 102, such as through keypad inputs, indicating that he desires to receive navigational instructions using warm start conditions. A user may select the warm start option after initiating and subsequently pausing a navigation session. Illustratively, a user walking through a downtown setting while receiving navigational instructions may decide to pause the session to shop at a retail store encountered along a path to a final destination. Upon completing such shopping, the user can then select the warm start option of step 602.

The method then immediately resumes providing navigational instructions as indicated at step 604. Importantly, prior to executing step 604, the method of the present invention does not need to determine the location of the user. The method can initially assume that the user has made a reasonable choice such that the navigational instructions immediately provided are useful. Upon transmitting navigational directions to the user at step 604, the method of the present invention then performs steps to check whether the user's choice was indeed reasonable. At step 606, the method determines the user's position in a similar manner as described in other embodiments of the invention. The method of the present invention then determines whether the user's location is ambiguous at step 608. If the user's position is determined not to be ambiguous, the method determines that the user has made a reasonable choice to use the warm start option. The method of the present invention therefore continues transmitting navigational directions to the user at step 610. If the user's position is determined to be ambiguous at step 608, the method then removes the ambiguity at step 616. Methods described in other parts of the present disclosure are appropriately implemented at step 616. Upon removing the ambiguity of the user's location, navigational instructions are transmitted to the user at step 620.

Referring back to step 602, a user can select a cold start option indicating that the user believes that his location is not precisely known by the real-time navigation system. Accordingly, the method of the present invention determines the user's position at step 612 in a similar manner as described in other embodiments of the invention. The method of the present invention then determines whether the user's location is ambiguous at step 614. A user's location may be determined not to be ambiguous if, for example, the user's location is near a recently determined position. Illustratively, a user walking through a downtown setting may have previously requested and received navigational directions to a first retail store. Upon completing shopping at the first retail store, the user may then request directions to a second retail store starting at the first retail store. Advantageously, the user is very near to the last position determined by the navigation system. Accordingly, the method may determine at step 614 that the user's location is not ambiguous. In another example, a user may receiving navigational directions for driving from place to place may receive directions only while in his car. Thus, upon reaching a first destination, such a user will return to his car to receive directions to a second destination. The method of the present invention will, therefore, determine that the user has returned to the last location known by the system—the location where the car was parked or stopped.

A user's location may also be determined not to be ambiguous if, for example, the user's location is near a user's historical locations. Illustratively, information can be used from a user that regularly travels certain paths or requests navigational directions starting from a particular point. The method of the present invention, uses such historical information to remove ambiguities in a user's location. The method of the present invention compares position information to paths historically traveled by the user. Moreover, the method of the present invention compares position information to intermediate points along those paths. In another embodiment of the invention, the method of the present invention compares position information with paths that have not necessarily been traveled, but have been planned and recorded. Accordingly, the method may determine at step 614 that the user's location is not ambiguous. It should be noted that the description and examples of step 614 are also applicable to step 608 and vice versa.

In situations where a cold start option has been selected, but where a user's location is not ambiguous, the method of the present invention executes step 618 to transmit navigational directions to a user. However, where a cold start option has been selected and the user's location is determined to be ambiguous, step 616 is executed to remove ambiguities in the user's location. Upon removing such ambiguities, step 620 is executed to transmit directions to the user.

In the description of FIG. 6, steps 604, 610, 618 and 620 were generally described as transmitting directions to the user so as to provide a concise description of the invention. One of skill in the art will, however, understand that other steps may be necessary to ultimately transmit directions to the user. For example, the method of FIG. 6 can be modified to receive input from the user as to his desired destination or desired path.

The foregoing descriptions of specific embodiments of the present invention have been presented for purposes of illustration and description. They are not intended to be exhaustive or to limit the invention to the precise forms disclosed. Many modifications and variations are possible in light of the above teachings without deviation from the scope of the claims set out below. The embodiments were chosen and described in order to best explain the principles of the invention and its practical application, to thereby enable others skilled in the art to best utilize the invention and various embodiments with various modifications as are suited to the particular use contemplated.

What is claimed is:

1. A method for determining a user's location comprising:
   recording at least one travel path for a user;
   generating a plurality of path locations along the at least one travel path;
   generating a position signal;
   comparing the position signal with the plurality of locations along the at least one travel path;
   determining a first approximation of the user's location based upon the comparison of the position signal with the plurality of locations along the at least one travel path.

2. The method of claim 1, wherein the at least one travel path includes at least one path historically traveled by the user.

3. The method of claim 1, wherein the at least one travel path includes at least one previously planned path.

4. The method of claim 1, wherein the at least one travel path includes a travel path previously interrupted.

5. The method of claim 1, further comprising:
   presenting navigational directions to the user based upon the first approximation of the user's location.

6. The method of claim 1, further comprising:
   removing ambiguity in the first approximation of the user's location;
   determining a second approximation of the user's location based upon the removal of ambiguity.

7. The method of claim 6, wherein removing ambiguity in the first approximation of the user's location includes:
   generating a first set of candidates corresponding to locations in close proximity to the first approximation of the user's location;
   the user perceiving a vicinity of the user;
   the user selecting at least one preferred candidate from among the first set of locations according to a predetermined criteria.

8. The method of claim 7, wherein the at least one travel path includes at least one path historically traveled by the user.

9. The method of claim 7, wherein the at least one travel path includes at least one previously planned path.

10. The method of claim 7, wherein the at least one travel path includes a travel path previously interrupted.

11. The method of claim 7, further comprising:
    presenting navigational directions to the user based upon the first approximation of the user's location.

12. The method of claim 1, wherein the at least one travel path includes at least one path historically traveled by the user.

13. The method of claim 1, wherein the at least one travel path includes at least one previously planned path.

14. The method of claim 1, wherein the at least one travel path includes a travel path previously interrupted.

15. The method of claim 1, further comprising:
    presenting navigational directions to the user based upon the first approximation of the user's location.

16. A method for presenting navigational directions to a user, comprising:
    generating a first signal indicating a first mode operation;
    assigning a starting location responsive to the first signal;
    determining a path from the starting location toward a destination;
    generating navigational directions to guide the user from the starting location to the destination;
    presenting the navigational directions to the user; and
    removing ambiguity in the starting location to generate an improved starting location.

17. The method of claim 16, wherein the first signal is generated responsive to a user action.

18. The method of claim 17, wherein the user action is pressing a button on a wireless device.

19. The method of claim 17, wherein the user action is generation of an audible signal.

20. The method of claim 19, wherein the audible signal is a spoken message.

21. The method of claim 16, wherein removing ambiguity in the starting location to generate an improved starting location comprises:
    generating a position signal;
    comparing the position signal with a plurality of recorded locations;
    determining a first approximation of the user's location based upon the comparison of the position signal with the plurality of locations;
    comparing the first approximation of the user's location with the starting location based upon a predetermined criteria.

22. The method of claim 16, wherein removing ambiguity in the starting location includes:
    generating a first set of candidates corresponding to locations in close proximity to the starting location;
    selecting at least one preferred candidate from among the first set of locations according to a predetermined criteria.

23. The method of claim 16, wherein the step of removing ambiguity in the starting location to generate an improved starting location comprises:
    recording a travel path for the user;
    generating a plurality of path locations along the travel path;
    comparing the position signal with said plurality of path locations;
    generating an improved starting location for the user based in part on the comparison of the position signal to the plurality of path locations.

24. The method of claim 23, wherein said plurality of path locations comprises at least one previously planned path.

25. A method for presenting navigational directions to a user, comprising:
    recording at least one travel path for the user;
    generating a plurality of path locations along a first said travel path;
    receiving a position signal from the user;
    comparing the position signal to said path locations along said first travel path;
    determining an improved position for the user based at least in part on said comparison between the position signal and said path locations;

generating navigational directions to guide the user from the improved position to a destination; and presenting the navigational directions to the user.

26. The method of claim 25, wherein said step of recording at least one travel path is performed through the internet.

27. The method of claim 25, wherein said step of recording at least one travel path is performed through a wireless device.

28. The method of claim 25, wherein said step of presenting the navigational directions to the user is performed through a wireless device.

29. A method for presenting navigational directions to a user, comprising:

receiving a query for navigational directions from a user;

determining an expected position for the user;

receiving a position signal for the user;

comparing the position signal to the expected position for the user;

if the position signal corresponds to the expected position, presenting navigational directions to the user;

if the position signal does not correspond to the expected position, removing ambiguity from the user's position to identify an improved starting location, and presenting navigational directions to the user from the improved starting location.

30. The method of claim 29, wherein said step of removing ambiguity from the user's position comprises:

recording a travel path for the user;

generating a plurality of path locations along the travel path;

comparing the position signal with said plurality of path locations; and generating an improved starting location for the user based in part on the comparison of the position signal to the plurality of path locations.

31. The method of claim 29, further comprising storing historical travel information for the user and wherein said step of removing ambiguity from the user's position comprises comparing said position signal to said historical travel information.

32. The method of claim 29 further comprising storing preplanned travel information for the user and wherein said step of removing ambiguity from the user's position comprises comparing said position signal to said preplanned travel information.

\* \* \* \* \*